United States Patent
Vocke et al.

[15] 3,676,643
[45] July 11, 1972

[54] REMOVABLE WARNING TRAY ASSEMBLY

[72] Inventors: Elmer E. Vocke, Belleville; Albert L. Baltz, Millstadt, both of Ill.

[73] Assignee: Eagle Range & Manufacturing Company, Belleville, Ill.

[22] Filed: June 11, 1971

[21] Appl. No.: 152,148

[52] U.S. Cl.............................219/432, 219/447, 219/464, 219/541
[51] Int. Cl..........................................F27d 11/2
[58] Field of Search................219/403, 444, 447, 445, 541, 219/336, 351, 432–435, 464; 99/378; 257/291

[56] References Cited

UNITED STATES PATENTS

| | | | |
|---|---|---|---|
| 2,450,336 | 9/1948 | Hall | 219/432 |
| 3,043,569 | 7/1962 | Armentrout | 257/291 |
| 1,704,270 | 3/1929 | Wells | 219/432 |
| 3,440,404 | 4/1969 | Prescott | 219/432 |
| 3,313,919 | 4/1933 | Richardson et al. | 219/433 |
| 3,366,776 | 1/1968 | Knight et al. | 219/432 |
| 2,786,929 | 3/1957 | Michaelis | 219/445 |
| 2,885,526 | 5/1959 | Paulding | 219/541 X |
| 3,525,852 | 8/1970 | Filipak | 219/444 |
| 3,548,154 | 12/1970 | Christiansson | 219/403 |
| 3,600,554 | 8/1971 | Bange | 219/432 |

Primary Examiner—Volodymyr Y. Mayewsky
Attorney—Cohn and Powell

[57] ABSTRACT

The assembly includes a base structure and an electrically heated, removable warming tray, the base and the tray each having compatible, interconnecting electrical connectors. The tray includes downwardly projecting legs and the base includes a support deck providing grooves receiving the legs to align and guide the tray into electrical connection with the base structure. The base includes front stops engagable by the legs to preclude inadvertent uncoupling of the tray and to retain the tray in position relative to the base.

5 Claims, 6 Drawing Figures

PATENTED JUL 11 1972  3,676,643

INVENTORS
ELMER E. VOCKE
ALBERT L. BALTZ
BY *Cohn and Powell*
ATTORNEYS 3,676,643

REMOVABLE WARNING TRAY ASSEMBLY

BACKGROUND OF THE INVENTION

This invention relates in general to a domestic heating appliance and in particular to a removable warming tray electrically connectable to an independent support structure.

The convenience of providing an electrically heated warming unit located in the vicinity of an electric or gas heating range has been recognized, and such units serve the purpose of maintaining food in a heated condition while other portions of a meal are being prepared. Electrically heated trays are also known which are used essentially to transfer heated food to a dining area where the tray is connected to a dining room outlet by means of a conventional electric cord and maintained in a heated condition during the meal. Such trays may, of course, be cord-connected to a kitchen outlet also but the cord type connection is cumbersome and an inherent disadvantage. The problem of storage for such trays has also proved to be a considerable disadvantage since they tend to occupy valuable kitchen cabinet space. Further, they are suceptible to being inadvertently upset because they are not suitably restrained from movement.

No warming unit which can be satisfactorily stored in one area such as a kitchen and yet is provided with a simply and easily disconnectable electrical coupling is known in the prior art.

SUMMARY OF THE INVENTION

The assembly provides a warming tray which is installed on a supporting base structure in heat transfer relation thereto, to maintain food in a heated condition. The electrical connection between the base and the tray is automatically aligned to facilitate connection and coupling is achieved without the need for an intermediate electrical cord. The tray may be mounted above a heating range to conserve space and once electrical coupling is accomplished the tray is restrained from inadvertent movement on the base tending to disconnect the electrical coupling.

The assembly includes a support means providing the base structure and having a rearwardly disposed first electrical connector and a removably mountable electrically heated warming tray provided with a compatible second electrical connector. Guide means between the base and the tray align and condition the connector parts for coupling, which is accomplished by urging the tray rearwardly relative to the base into an installed position. The base includes stop means engageable by the tray when the electrical connection is made to substantially preclude forward uncoupling of the connector parts.

The base includes a generally coplanar deck having groove means at each end and the tray includes leg means receivable by said groove means to guide the tray into electrically coupled relation with base deck. Each of the groove means includes a rearward slot and a forward aperture and the leg means includes front and rear depending legs. The rear legs are receivable by associated rear slots and the front legs are receivable within associated front apertures to substantially preclude pivotal movement of the tray about the electrical connection in the plane of the deck means when said connection has been made.

The base includes an elongate back member, and the first electrical connector includes a tapered plug projecting forwardly of said back member. The second connector includes a socket receiving the tapered plug and cooperation between said plug and socket substantially restrains inadvertent upward movement of the tray at the connection point.

DESCRIPTION OF THE PREFERRED EMBODIMENT

Figure 1:
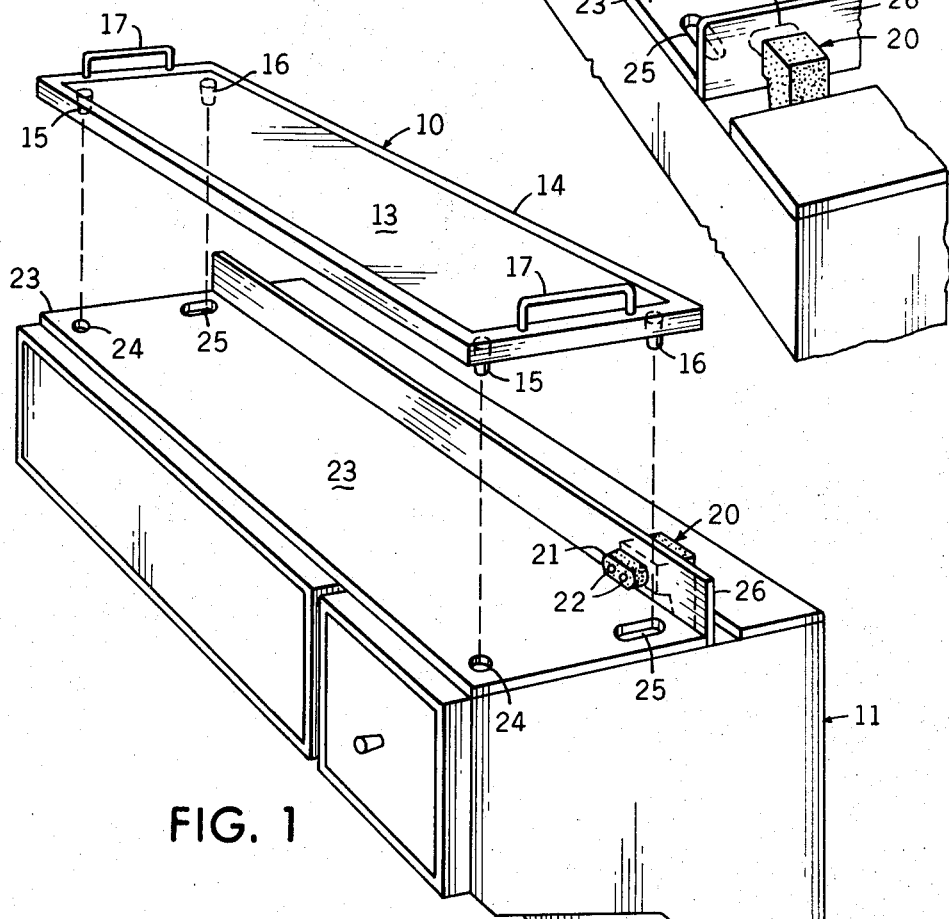
FIG. 1 is a perspective view of the warming tray assembly.

Referring now by characters of reference to the drawing and first to FIG. 1 it will be understood that the warming tray 10 is used in conjunction with a base structure 11, constituting a support means. The base 11 is typically mounted in cantilever relation to a gas or electric range generally indicated by numeral 12.

Figure 4:
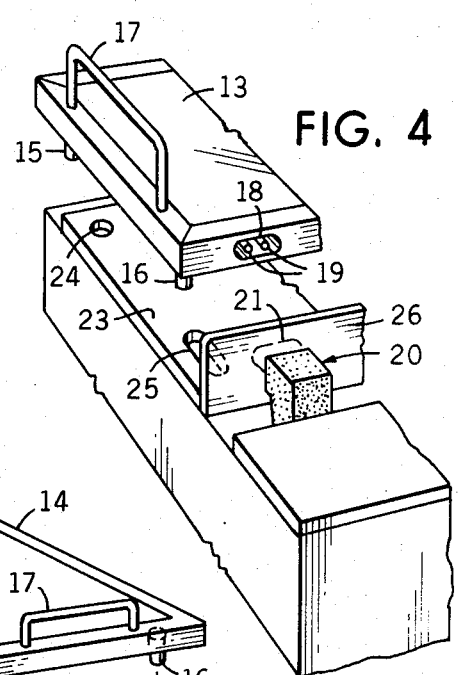
FIG. 4 is a fragmentary perspective rear view of the assembly prior to installation of the tray.

The tray 10 includes an electric heating panel 13 having a peripheral frame 14 and is provided with front and rear depending legs 15 and 16 respectively constituting leg means. Carrying handles 17 are provided at each end of the tray. At its rear side as shown particularly in FIG. 4, the warming tray 10 includes an electrical socket connection 18 provided with a pair of recessed pins 19, and the base 11 includes an electrical connector unit 20 providing a tapered plug 21 receivable within said socket 18. The plug 21 includes a pair of pin receiving apertures 22 and said socket 18 and plug 21 provide connector parts effectuating electrical coupling of the tray 10 and the base 11.

The base 11 includes an upper deck plate 23, constituting a deck means, which is provided at each end with a front aperture 24 and an aligned fore and aft oriented rear slot 25. The apertures 24 and slots 25 constitute groove means receiving associated front and rear legs 15 and 16 respectively as will be described. As shown clearly in FIG. 2 the base 11 includes a back plate 26 which provides support for the connector unit 20.

Figure 3:
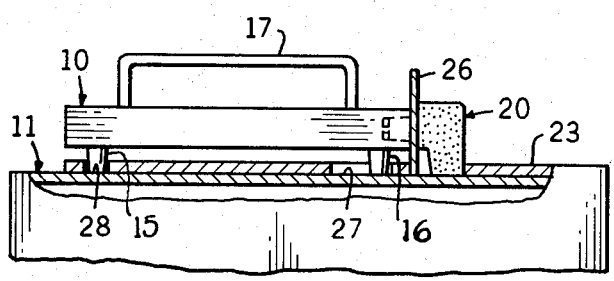
FIG. 3 is a similar view after installation.
Figure 2:
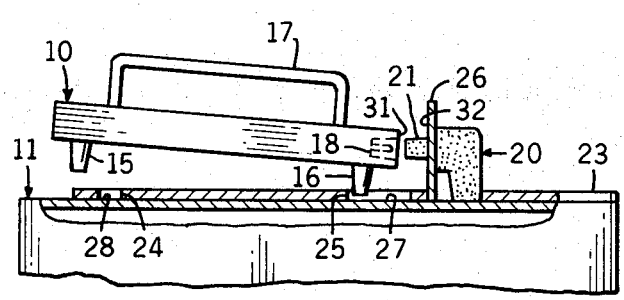
FIG. 2 is a fragmentary end view of the assembly partly in cross section prior to installation of the tray.
Figure 5:
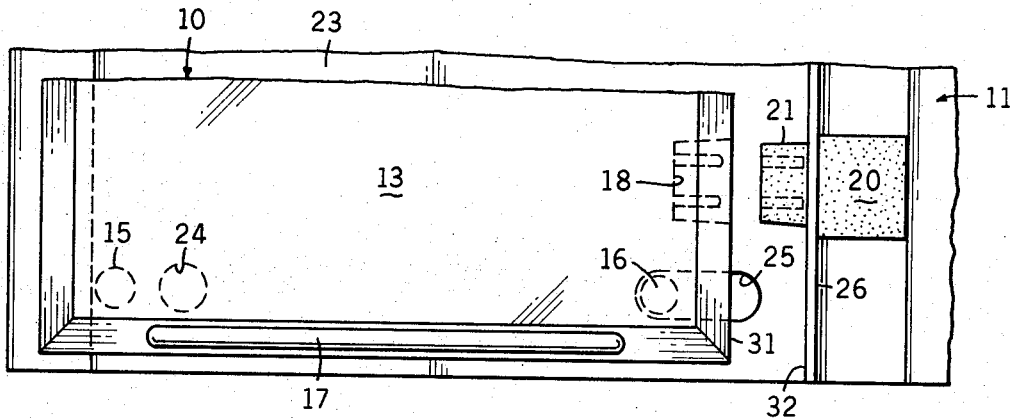
FIG. 5 is a fragmentary plan view illustrating the relationship of connector parts prior to installation.
Figure 6:
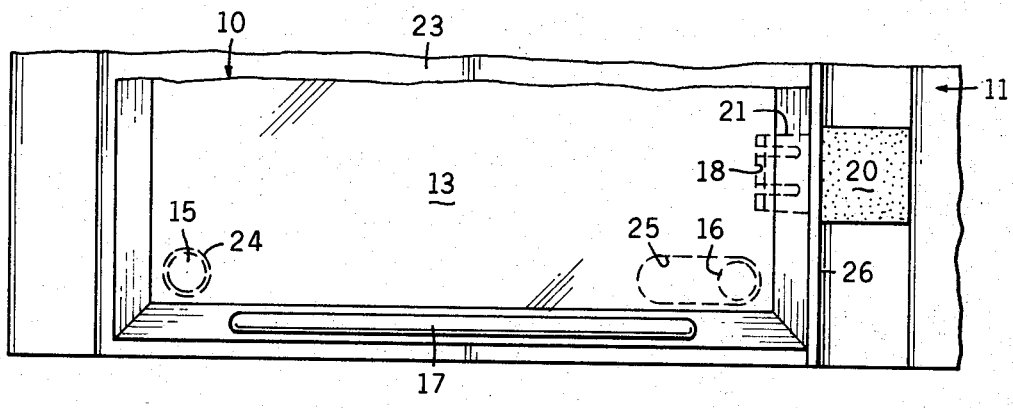
FIG. 6 is a similar view after installation.

The structural arrangement between the slots 25 and the rear legs 16 is such that said legs and slots constitute guide means aligning the tray 10 with the base 11 for correct coupling of the electrical connectors. In the installed position, as shown in FIG. 3, the rear legs 16 are seated on the bottom face 27 of the slots 25 and the front legs 15 are seated on the bottom face 28 of the apertures 24. These faces 27 and 28 are in the same plane somewhat below the general level of the deck plate 23. Because of this the tray 10 must be slightly tilted, as shown in FIG. 2, to permit the electrical connection to be made by urging the tray 10 rearwardly. It will be understood that the slots 25 extend forwardly a sufficient amount so that the rear legs 16 are accommodated within said slots 25 prior to the coupling of the plug 21 within the socket 18. When coupling is achieved, the front legs 15 are automatically aligned with the apertures 24 and the tray 10 may be lowered into parallel relation with the deck plate 23. Because they extend below the level of the deck plate 23 the apertures 24 provide abutment portions engageable with the forward, shoulder portions of the legs 15 to retain the tray 10 in position and preclude inadvertent horizontal movement of the tray 10 in forward, uncoupling direction. It will be understood that in the preferred embodiment the apertures 24 also provide a restraining means against rearward movement of the tray 10. Depending on the structural arrangement of parts, rearward restraint is also provided by engagement of the tray front edge 31 against the back plate front face 32, by the bottoming out of the plug 21, or by engagement between the rear leg 16 and the rearward end of the slot 25 as is clear from a consideration of FIGS. 5 and 6.

In particular, the provision of engagement points between the front legs 15 and the apertures 24 precludes any tendency of the tray 10 to pivot about the electrical connection in the plane of the deck plate 23. Further, engagement between the socket 18 and plug 21 provides a restraining function in that this engagement precludes inadvertent vertical movement of the rear side of the tray 10 relative to the deck plate 23.

In use, the tray 10 is electrically coupled to the base 11 by simply grasping the handles 17, locating the rear legs 16 in the guide slots 25 and urging the tray rearwardly, at a slight angle to the horizontal, until vertical alignment between the front legs 15 and the apertures permits the tray to be lowered into parallel alignment with the deck plate 23. Obviously, the tapered configuration of the plug 21 facilitates this operation because the end of the plug 21 is smaller than the mouth of the socket 18. In order to uncouple the electrical connection, it is necessary merely to raise the front side of the tray 10 by rotating slightly about the rear side until the legs 15 clear the associated apertures 24 at which time electrical uncoupling may be effectuated simply by urging the tray 10 translationally in a forward direction away from the back plate 26.

It will be clear from the above description that the structural arrangement of parts between the tray 10 and the base 11 provides a guide means aligning the socket 18 with the plug 21 prior to actual coupling of said connectors. Further, once the installation of tray 10 has been achieved engagement between the front legs 15 and the compatible apertures 24 provides an effective restraint against horizontal movement tending to uncouple the electrical connection. In addition, the connector parts cooperate to restrain the tray 10 against direct upward movement at the electrical connection.

We claim as our invention:

1. A removable warming tray assembly comprising:
   a. support means including a rearwardly disposed first electrical connector,
   b. an electrically heated warming tray mounted in removable relation to said support means and including a second electrical connector, and
   c. guide means between said support means and said tray aligning and conditioning said first and second connectors for mutual coupling as the tray is urged rearwardly relative to said support means,
   d. the tray including substantially coplanar seating means engageable with the support means below the connectors, and
   e. the support means including spaced stop means, forwardly disposed of the first electrical connector and engageable by the tray when the electrical connectors are coupled to substantially preclude forward uncoupling of the connectors when the tray is seated.

2. A removable warming tray assembly comprising:
   a. a support means including:
      1. a generally coplanar deck means having guide means and stop means at each end, and
      2. a rearwardly disposed first electrical connector disposed above the plane of said deck means, and
   b. an electrically heated warming tray mounted in removable relation to said support means and including:
      1. a rearwardly disposed compatible second electrical connector, and
      2. depending leg means at each end of the tray engageable by said guide means to align and condition said first and second connectors for coupling as said tray is urged rearwardly relative to said support means and engageable with the stop means when the connectors are coupled to substantially preclude forward uncoupling of the connectors.

3. A tray assembly as defined in claim 2 in which:
   c. each of said guide means includes a substantially fore and aft oriented slot and a forwardly disposed abutment portion providing the stop means, and
   d. each of said leg means includes a rearward portion receivable by said slot in guided relation and a forward shoulder portion engageable with said forwardly disposed abutment portion to substantially preclude said forward uncoupling of the connectors when said forwardly disposed abutment portion is engaged by said forward shoulder portion.

4. A tray assembly as defined in claim 2, in which:
   c. each of said guide means includes a rearwardly disposed slot and a forwardly disposed aperture providing the stop means,
   d. each of said leg means includes a rear, depending leg receivable by an associated rear slot in guided relation and a front depending leg receivable within an associated front aperture to substantially preclude pivotal movement of the tray about the electrical connection in the plane of the deck means.

5. A removable warming tray assembly comprising:
   a. support means including deck means providing forwardly disposed stop means and a rearwardly disposed first electrical connector,
   b. an electrical heated warming tray mounted in removable relation to said support means and including a second electrical connector and substantially coplanar seating means engageable with the support means below the electrical connectors, said tray being engageable with the stop means when the electrical connectors are coupled to substantially preclude forward uncoupling of said connectors in the plane of the deck means, and
   c. substantially horizontal guide means aligning and conditioning said first and second connectors for mutual coupling as the tray is urged rearwardly relative to said support means,
   d. one of said connectors including a tapered plug and the other of said connectors including a socket receiving said plug.

* * * * *